United States Patent
Shang et al.

(10) Patent No.: US 9,825,740 B2
(45) Date of Patent: Nov. 21, 2017

(54) METHOD FOR CARRIER AGGREGATION TRANSMISSION AND APPARATUS FOR REALIZING CARRIER AGGREGATION TRANSMISSION

(71) Applicant: Huawei Technologies Co., Ltd., Shenzhen (CN)

(72) Inventors: Zheng Shang, Shenzhen (CN); Zongjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 14/808,997

(22) Filed: Jul. 24, 2015

(65) Prior Publication Data
US 2015/0333881 A1 Nov. 19, 2015

Related U.S. Application Data

(63) Continuation of application No. PCT/CN2013/070996, filed on Jan. 25, 2013.

(51) Int. Cl.
*H04L 5/00* (2006.01)
*H04W 72/04* (2009.01)
*H04W 72/00* (2009.01)

(52) U.S. Cl.
CPC ............ *H04L 5/001* (2013.01); *H04L 5/0044* (2013.01); *H04W 72/0453* (2013.01); *H04W 72/00* (2013.01)

(58) Field of Classification Search
CPC ..... H04L 5/001; H04L 5/0044; H04L 45/245; H04W 72/0453; H04W 72/00
(Continued)

(56) References Cited

U.S. PATENT DOCUMENTS

2008/0212540 A1 9/2008 Durand et al.
2011/0211489 A1* 9/2011 Chung .................... H04L 5/001
370/252
(Continued)

FOREIGN PATENT DOCUMENTS

| CN | 101465831 A | 6/2009 |
|---|---|---|
| CN | 101808402 A | 8/2010 |
| WO | WO 2011120237 A1 | 10/2011 |

OTHER PUBLICATIONS

"3$^{rd}$ Generation Partnership Project; Technical Specification Group Radio Access Network; Evolved Universal Terrestrial Radio Access (E-UTRA); Base Station (BS) radio transmission and reception (Release 11)," 3GPP TS 36.104, V11.3.1, pp. 1-133, 3$^{rd}$ Generation Partnership Project, Valbonne, France (Jan. 2013).
(Continued)

*Primary Examiner* — Christine Ng
(74) *Attorney, Agent, or Firm* — Leydig, Voit & Mayer, Ltd.

(57) ABSTRACT

A carrier aggregation transmission method and apparatus are provided. The method includes: bearing N carriers in a preset band, where N is a positive integer greater than 1, and a nominal bandwidth values of the carriers are less than or equal to 5 MHz; aggregating the N carriers, to make nominal channel spacing between adjacent carriers among the N carriers is integral multiples of 0.2 MHz; and transmitting the N aggregated carriers. Besides, by further appropriately setting the chip rate corresponding to the carriers with different nominal bandwidths, the performance of small-bandwidth and narrow-bandwidth aggregation systems is efficiently improved, and existing hardware and algorithms can be reused.

17 Claims, 11 Drawing Sheets

(58) Field of Classification Search
USPC .......................................... 370/328, 338, 401
See application file for complete search history.

(56) References Cited

U.S. PATENT DOCUMENTS

| | | | | |
|---|---|---|---|---|
| 2012/0270537 | A1* | 10/2012 | Weng ................... | H04W 48/16 455/424 |
| 2014/0161052 | A1* | 6/2014 | Kazmi ................. | H04L 5/0041 370/329 |
| 2014/0293818 | A1* | 10/2014 | Sesia ................... | H04B 17/318 370/252 |
| 2015/0092653 | A1* | 4/2015 | Frenger ............ | H04W 72/1215 370/312 |

OTHER PUBLICATIONS

"$3^{rd}$ Generation Partnership Project; Technical Specification Group Radio Access Network; E-UTRA, UTRA and GSM/EDGE; Multi-Standard Radio (MSR) Base Station (BS) conformance testing (Release 10)," 3GPP TS 37.141, V10.9.1, pp. 1-107, $3^{rd}$ Generation Partnership Project, Valbonne, France (Jan. 2013).

\* cited by examiner

METHOD FOR CARRIER AGGREGATION TRANSMISSION AND APPARATUS FOR REALIZING CARRIER AGGREGATION TRANSMISSION

CROSS-REFERENCE TO RELATED APPLICATIONS

This application is a continuation of International Patent Application No. PCT/CN2013/070996, filed on Jan. 25, 2013, which is hereby incorporated by reference in its entirety.

FIELD

The present disclosure relates to the technical field of communication, and in particular to a carrier aggregation transmission method and an apparatus for implementing carrier aggregation transmission.

BACKGROUND

Currently, FDD (Frequency-division duplexing) of UMTS (Universal Mobile Telecommunications System) supports only one nominal bandwidth (also referred to as nominal channel spacing) and one chip rate. That is, a nominal bandwidth of 5 Mega Hertz (referred to as MHz for short) corresponds to a chip rate of 3.84 Mega chips per second (referred to as Mcps for short). Future service demands have higher requirements on the UMTS, including wider coverage, higher capacity and rate, and larger number of supported connection, such as MTC (Machine type communication) service. To support a higher rate, a potential technical solution is to make the UMTS support less bandwidth (less than 5 MHz) and employ narrow band carrier aggregation. With this technology, the link performance and system capacity of the UMTS can be effectively improved. In addition, with the gradually exiting of the global system for mobile communications (Global System For Mobile Communications, referred to as GSM for short), a realistic question is how to reform the spectrum of the GSM. The less bandwidth and the narrow band carrier aggregation technique provide the probability of aggregating the spectrum of the GSM for the UMTS system.

In the discussion of the standard of the NCT (New Carrier Type) in LTE (Long Term Evolution), a standalone NCT manner and a non-standalone NCT manner are proposed. As with legacy carrier, in the standalone NCT, a synchronous/broadcast/common channel is supported, to provide the terminal with access reference. The non-standalone carrier is mainly adapted to provide data transmission. The synchronous/broadcast/common channel can be selectively deleted for reducing the system overhead, and thus the non-standalone does not support access of a user.

In the conventional art, the less bandwidth is realized by reducing the chip rate, in which the original frame structure is remained unchanged, i.e., the number of the sampling points of the chip contained in the frame is unchanged, which is equivalent to lengthening the physical time of the frame. However, the system performance with this method is not good enough. For example, the delay is relatively longer. Further, in the case that a terminal supports carrier aggregations with different bandwidths, the complexity of the terminal is increased greatly. Another way to make the UMTS support less bandwidth is to redesign the frame structure, which needs to redefine the carrier bandwidth to be supported and the corresponding chip rate. In the conventional art, one way is to divide the bandwidth of 5 MHz uniformly. For example, the bandwidth of 5 MHz is divided into 2, 3 or 4 segments uniformly, following three system bandwidths are supported: 2.5 MHz, 1.66 MHz and 1.25 MHz, and the corresponding chip rates are respectively 1.92 Mcps, 1.28 Mcps and 0.96 Mcps.

Referring to FIG. 1, the bandwidth of 5 MHz is divided into 4 segments uniformly. Assuming that only one standalone small carrier is provided in the legacy bandwidth of 5 MHz, C2 is a standalone carrier, and C0, C1 and C3 are non-standalone carriers. If a narrow bandwidth is formed by dividing the legacy bandwidth of 5 MHz uniformly, and in the case that the legacy bandwidth of 5 MHz is divided into N (assuming that N<=5, i.e., the lest bandwidth is 1 MHz) narrow band carriers uniformly, the lest spacing $\Delta f_{min}$ between the center of the narrow band carrier and the center frequency of the original bandwidth of 5 MHz is:

$$\Delta f_{min} = \begin{cases} 0 & N = 3.5 \\ 1.25 \text{ MHz} & N = 2 \\ 0.625 \text{ MHz} & N = 4 \end{cases}$$

In the conventional UMTS system, the channel raster $\Delta f$ is 0.2 MHz. It can be seen from above equation that in the case that N is an even number, it cannot be ensured that the distance between the narrow band carrier and the center frequency of the legacy carrier is integral multiples of 0.2 MHz, no matter which narrow band carrier is set as the standalone carrier. However, in the case that N is an odd number, the standalone narrow band is provided at the center frequency of the legacy bandwidth of 5 MHz, i.e., it can be ensured that the standalone narrow band is swept at a frequency sweep granularity of 0.2 MHz. With this method, only in the case that the N is an odd number, it can be ensured that the narrow band carrier is swept at the frequency sweep granularity of 0.2 MHz. If a new frequency sweep granularity and a frequency sweep initial offset are introduced, the frequency sweep time of the terminal is increased greatly. Thus, with the way of dividing the bandwidth of 5 MHz uniformly, the frequency sweep time of the terminal is increased, and the number of the less bandwidth that can be supported is restrained.

SUMMARY

It is provided a carrier aggregation transmission method and an apparatus for implementing carrier aggregation transmission in the embodiments of the disclosure, for effectively improving the performance of a UMTS system, making the aggregated carrier taking into account both the channel raster and the chip rate of the UMTS system, and increasing the availability of the existing hardware and algorithms.

In a first aspect, it is provided a carrier aggregation transmission method according to an embodiment of the disclosure. The method includes:

bearing N carriers in a preset band, where N is a positive integer greater than 1, and a nominal bandwidth value of the carrier is less than or equal to 5 MHz;

aggregating the N carriers, to make nominal channel spacing between adjacent carriers among the N carriers is integral multiples of 0.2 MHz; and transmitting the N aggregated carriers.

In a first possible embodiment, in conjunction with the first aspect, a chip rate Fc of the carrier may be equal to 3.84 Mega chips per second Mcps divided by Nc, where Nc is a positive integer;

a shaping filter factor Fsp of the carrier may range from 1.2 to 1.3; and a nominal bandwidth value B of the carrier may be equal to Fc multiplied by Fsp, and may be integral multiples of 0.2 MHz.

In a second possible embodiment, in conjunction with the first aspect, or the first possible embodiment in the first aspect, a nominal bandwidth value B of the carrier may belong to a first set B1 and the first set B1 may be {0.6 MHz, 0.8 MHz, 1.2 MHz, 1.6 MHz, 2.4 MHz}.

Further, the nominal channel spacing between the adjacent carriers may be obtained by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In a third possible embodiment, in conjunction with the second possible embodiment, the method may further include setting a chip rate Fc of the carrier, where the chip rate Fc may belong to a set Fc1 and the set Fc1 may be {0.48 Mcps, 0.64 Mcps, 0.96 Mcps, 1.28 Mcps, 1.92 Mcps}; and in a case that the chip rate Fc is 0.48 Mcps, the nominal bandwidth value of the carrier is 0.6 MHz;

in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

In a fourth possible embodiment, in conjunction with the first aspect, or the first possible embodiment in the first aspect, a nominal bandwidth value B of the carrier may belong to a second set B2 and the second set B2 may be {0.8 MHz, 1.2 MHz, 1.6 MHz, 2.4 MHz}.

Further, a half of a sum of the nominal bandwidth values of the adjacent carriers may be calculated as the nominal channel spacing between the adjacent carriers.

In a fifth possible embodiment, in conjunction with the fourth possible embodiment in the first aspect, the method may further include setting a chip rate Fc of the carrier, where the chip rate Fc belongs to a set Fc2 and the set Fc2 may be {0.64 Mcps, 0.96 Mcps, 1.28 Mcps, 1.92 Mcps}; and in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

In a sixth possible embodiment, in conjunction with the first aspect, or the first possible embodiment in the first aspect, a nominal bandwidth value B of the carrier may belong to a third set B3 and the third set B3 may be {0.6 MHz, 0.8 MHz, 1.2 MHz, 1.6 MHz, 2.4 MHz, 5 MHz}.

Further, the nominal channel spacing between the adjacent carriers may be obtained by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In a seventh embodiment, in conjunction with the first aspect, or the first possible embodiment in the first aspect, a nominal bandwidth value B of the carrier may belong to a fourth set B4 and the fourth set B4 may be {0.8 MHz, 1.2 MHz, 1.6 MHz, 2.4 MHz, 5 MHz}.

Further, the nominal channel spacing between the adjacent carriers may be obtained by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In a second aspect, it is further provided an apparatus for implementing carrier aggregation transmission. The apparatus includes a bearing module, an aggregation module and a transmission module; where the bearing module is configured to bear N carriers in a preset band, where N is a positive integer greater than 1, and a nominal bandwidth value of the carrier is less than or equal to 5 MHz;

the aggregation module is configured to aggregate the N carriers, to make nominal channel spacing between adjacent carriers of the N carriers is integral multiples of 0.2 MHz; and the transmission module is configured to transmit the N aggregated carriers from the aggregation module.

In a first possible embodiment, in conjunction with the second aspect, a chip rate Fc of the carrier of the N carriers may be equal to 3.84 Mega chips per second Mcps divided by Nc, where Nc is a positive integer;

a shaping filter factor Fsp of the carrier may range from 1.2 to 1.3; and a nominal bandwidth value B of the carrier may be equal to Fc multiplied by Fsp, and may be integral multiples of 0.2 MHz.

In a second possible embodiment, in conjunction with the second aspect, or the first possible embodiment in the second aspect, a nominal bandwidth value B of the carrier may belong to a first set B1 and the first set B1 may be {0.6 MHz, 0.8 MHz, 1.2 MHz, 1.6 MHz, 2.4 MHz}.

Further, the aggregation module may include a first calculation unit, and the first calculation unit may be configured to calculate the nominal channel spacing between the adjacent carriers based on the nominal bandwidth values of the N carriers in the preset band by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In a third possible embodiment, in conjunction with the second possible embodiment in the second aspect, the apparatus may further include a first rate setting module configured to set a chip rate Fc of the carrier; where the chip rate Fc may belong to a set Fc1 and the set Fc1 may be {0.48 Mcps, 0.64 Mcps, 0.96 Mcps, 1.28 Mcps, 1.92 Mcps}, and in a case that the chip rate Fc is 0.48 Mcps, the nominal bandwidth value of the carrier is 0.6 MHz;

in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

In a fourth possible embodiment, in conjunction with the second aspect, or the first possible embodiment in the second aspect, a nominal bandwidth value B of the carrier may belong to a second set B2 and the second set B2 may be {0.8 MHz, 1.2 MHz, 1.6 MHz, 2.4 MHz}.

Further, the aggregation module may include a second calculation unit, the second calculation unit may be configured to calculate the nominal channel spacing between the adjacent carriers based on the nominal bandwidth values of the N carriers in the preset band by:

calculating a half of a sum of the nominal bandwidth values of the adjacent carriers as the nominal channel spacing between the adjacent carriers.

In a fifth possible embodiment, in conjunction with the second aspect, or the first possible embodiment in the second aspect, a nominal bandwidth value B of the carrier may belong to a third set B3 and the third set B3 may be {0.6 MHz, 0.8 MHz, 1.2 MHz, 1.6 MHz, 2.4 MHz, 5 MHz}.

Further, the aggregation module may include a third calculation unit, and the third calculation unit may be configured to calculate the nominal channel spacing between the adjacent carriers based on the nominal bandwidth values of the N carriers in the preset band by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In a sixth possible embodiment, in conjunction with the second aspect, or the first possible embodiment in the second aspect, a nominal bandwidth value B of the carrier may belong to a fourth set B4 and the fourth set B4 may be {0.8 MHz, 1.2 MHz, 1.6 MHz, 2.4 MHz, 5 MHz}.

Further, the aggregation module may include a fourth calculation unit, the fourth calculation unit may be configured to calculate the nominal channel spacing between the adjacent carriers based on the nominal bandwidth values of the N carriers in the preset band by:

calculating a half of a sum of the nominal bandwidth values of the adjacent carriers as the nominal channel spacing between the adjacent carriers.

In a third aspect, it is further provided an apparatus for implementing carrier aggregation transmission. The apparatus includes an inputting device, an outputting device, a storage apparatus and a processor; wherein the processor is configured to:

bear N carriers in a preset band, where N is a positive integer greater than 1, and a nominal bandwidth value of the carrier is less than or equal to 5 MHz; and aggregate the N carriers, to make nominal channel spacing between adjacent carriers of the N carriers is integral multiples of 0.2 MHz, and the outputting device is configured to transmit the N aggregated carriers from the aggregation module.

It can be seem from above that in an embodiment of the disclosure, multiple carriers are borne in a preset band, and then the multiple carriers are aggregated, to make the nominal channel spacing between adjacent carriers of the multiple carriers is integral multiples of 0.2 MHz. Thus, the carrier aggregation transmission can be implemented without changing the swept frequency capability or method of a present UMTS terminal, and existing hardware and algorithms can be reused.

DETAILED DESCRIPTION

Figure 1:
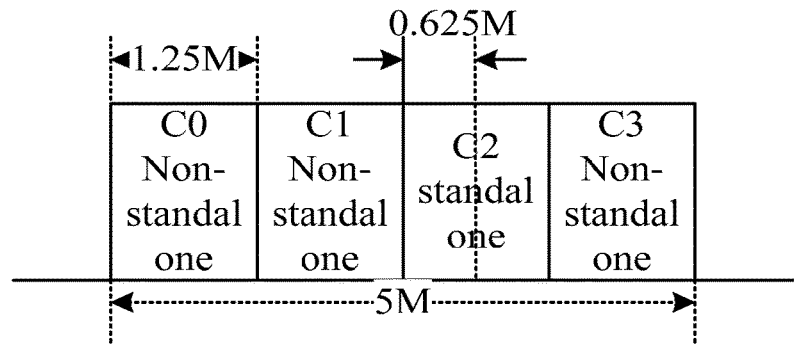
FIG. 1 is a schematic diagram of carrier aggregation in the conventional art.

It is provided a carrier aggregation transmission method and an apparatus for implementing carrier aggregation transmission in an embodiment of the disclosure, for effectively improving the performance of a UMTS system, making the aggregated carrier taking into account both the channel raster and the chip rate of the UMTS system, and increasing the availability of the existing hardware and algorithms.

The technical solutions in the embodiments of the present disclosure will be described clearly and completely hereinafter in conjunction with the drawings in the embodiments of the present disclosure, so that the objects, technical solutions and advantages of the present disclosure will be clear to those skilled in the art. Apparently, the described embodiments are only a part but not all of the embodiments of the present disclosure. All the other embodiments obtained by those skilled in the art without creative effort on the basis of the embodiments of the present disclosure fall within the scope of protection of the present disclosure.

It is provided a carrier aggregation transmission method according to an embodiment of the disclosure. The method includes:

bearing N carriers in a preset band, where N is a positive integer greater than 1, and nominal bandwidth values of the carriers are less than or equal to 5 MHz;

aggregating the N carriers, to make a nominal channel spacing between adjacent carriers of the N carriers is integral multiples of 0.2 MHz; and transmitting the N aggregated carriers.

It is to be noted that the nominal channel spacing of the carriers in the embodiment of the disclosure is the nominal bandwidth of the carriers, and the nominal channel spacing between adjacent carriers is the spacing between center frequencies of two adjacent carriers.

The aggregated N carriers are also referred to as component carriers.

In an embodiment of the disclosure, the nominal channel spacing between two adjacent component carriers is defined as the spacing between center frequencies of two adjacent component carriers.

The carrier aggregation transmission method provided in an embodiment of the disclosure may be applied to a UMTS (Universal Mobile Telecommunication System), the bandwidth supported by the UMTS is 5 MHz, and the corresponding chip rate is 3.84 Mcps.

The aggregation in the embodiments of the disclosure refers to carrying modulation information on N carriers in a preset band and arranging the N carriers in the band in accordance with a specific nominal channel spacing between carriers.

Further, in the embodiments of the disclosure, the chip rate Fc of a carrier in a preset band, the forming filter factor Fsp and the nominal bandwidth value B of the carrier meet the following conditions:

the chip rate Fc of the carrier is equal to 3.84 Mega chips per second Mcps divided by Nc, where Nc is a positive integer; Nc is set as required, such as a value in a set of {2, 3, 4, 5, 6, 7, 8, 9, 10};

the forming filter factor Fsp ranges from 1.2 to 1.3; and the nominal bandwidth value B of the carrier is equal to Fc multiplied by Fsp. Multiple nominal bandwidth values of the carriers are obtained according to different values of the Fc and Fsp, and bandwidth values, which are integral multiples of 0.2 MHz, are selected from the multiple resultant bandwidth values as the final nominal bandwidth values of the N carriers.

It is obtained by the inventor of this disclosure upon tests that the nominal bandwidth values of the carriers that meeting the above conditions belong to a first set B1 which is {0.6 MHz, 0.8 MHz, 1.2 MHz, 1.6 MHz, 2.4 MHz}, and the chip rates one-to-one corresponding to the bandwidth values in the first set B1 belong to a set Fc1 which is {0.48 Mcps, 0.64 Mcps, 0.96 Mcps, 1.28 Mcps, 1.92 Mcps}.

Carriers are selected from the first set B1 for aggregation, and the nominal channel spacing between adjacent carriers is ensured to be integral multiples of 0.2 MHz.

Specifically, a half of a sum of the nominal bandwidth values of the adjacent carriers is calculated as a first result;

a half of an absolute value of a difference between the nominal bandwidth values of the adjacent carriers is calculated as a second result;

a remainder of the second result with respect to 0.2 MHz is calculated as a third result; and a sum of the first result and the third result is calculated as the nominal channel spacing between the adjacent carriers.

Thereby, the nominal channel spacing between any two adjacent carriers is integral multiples of 0.2 MHz. For example, if 0.8 MHz and 1.2 MHz are selected from the first set B1 respectively as the nominal bandwidth values of two adjacent carriers, the nominal channel spacing between the carrier with the bandwidth value of 0.8 MHz and the carrier with the bandwidth value of 1.2 MHz is (0.8 MHz+1.2 MHz)/2+mod [(1.2 MHz−0.8 MHz)/2, 0.2 MHz]=1 MHz=5*0.2 MHz. If 0.6 MHz and 0.8 MHz are selected from the first set B1 respectively as the nominal bandwidth values of two adjacent carriers, the nominal channel spacing between the carrier with the bandwidth value of 0.6 MHz and the carrier with the bandwidth value of 0.8 MHz is (0.6 MHz+0.8 MHz)/2+mod [(0.8 MHz−0.6 MHz)/2, 0.2 MHz] =0.8 MHz=4*0.2 MHz.

In a UMTS system, the channel raster is 0.2 MHz, and the center frequency of the legacy 5 MHz carrier is on the channel raster. Thus, as long as the spacing between the center frequency of the new carrier and the center frequency of the legacy 5 MHz carrier is integral multiples of 0.2 MHz, it can be ensured that the center frequency of the new carrier is on the channel raster and that the terminal is scanned at a sweep frequency granularity of 0.2 MHz.

It can be seem from above that in an embodiment of the disclosure, multiple carriers are borne in a preset band, and then the multiple carriers are aggregated, to make the nominal channel spacing between adjacent carriers of the multiple carriers is integral multiples of 0.2 MHz. Thus, the carrier aggregation transmission can be implemented without changing the swept frequency capability or method of an existing UMTS terminal, the performance of the less bandwidth and narrow band aggregation system is effectively improved, and existing hardware and algorithms can be reused.

Figure 2:
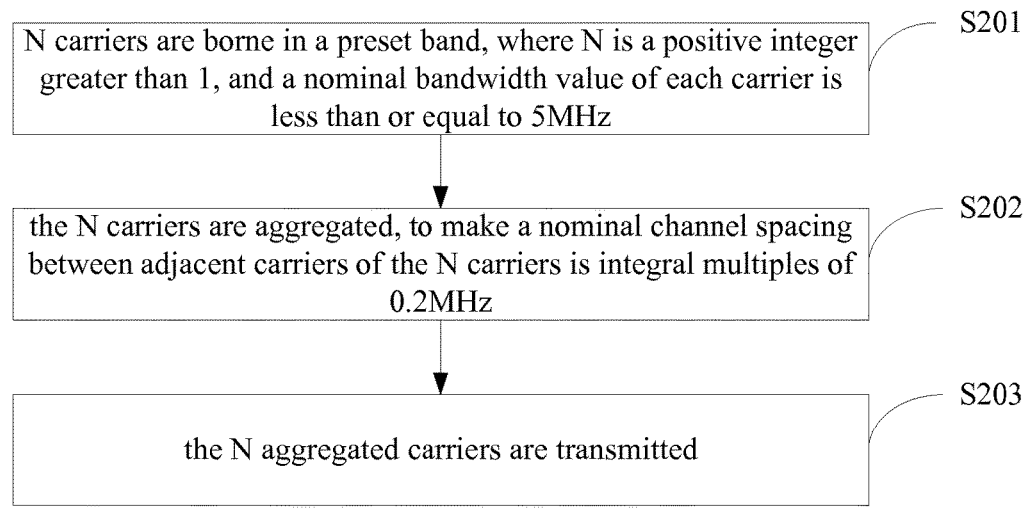
FIG. 2 is a schematic flowchart of a carrier aggregation transmission method according to an embodiment of the disclosure.

It is further provided a carrier aggregation transmission method according to an embodiment of the disclosure, as shown in FIG. 2. The method includes following steps S201 to S203.

In step S201, N carriers are borne in a preset band, where N is a positive integer greater than 1, and a nominal bandwidth value of each carrier is less than or equal to 5 MHz.

In step S202, the N carriers are aggregated, to make a nominal channel spacing between adjacent carriers of the N carriers is integral multiples of 0.2 MHz.

In step S203, the N aggregated carriers are transmitted.

It is to be noted that the carrier aggregation transmission method according to the embodiment of the disclosure may be adapted to perform carrier aggregation on the legacy 5 MHz carrier.

The above aggregation refers to carrying modulation information on multiple carriers in a preset band and arranging the N carriers in the band in accordance with a specific nominal channel spacing between carriers.

Further, in an embodiment of the disclosure, the chip rate Fc of the multiple carriers, the forming filter factor Fsp and the nominal bandwidth value B of the carrier meet the following conditions:

the chip rate Fc is equal to 3.84 Mcps/Nc, where Nc is a positive integer; Nc is set as required, such as a value in a set of {2, 3, 4, 5, 6, 7, 8, 9, 10};

1.2<=Fsp<=1.3; and

B=Fc*Fsp, and B=0.2 MHz*Nb1, where Nb1 is a positive integer.

The nominal bandwidth values of the carriers that meet the above conditions form a first set B1. The first set B1 is {0.6 MHz, 0.8 MHz, 1.2 MHz, 1.6 MHz, 2.4 MHz}. The chip rates corresponding to the bandwidth values in the first set B1 belong to Fc1. Fc1 is {0.48 Mcps, 0.64 Mcps, 0.96 Mcps, 1.28 Mcps, 1.92 Mcps}.

That is to say, in a case that the chip rate Fc is 0.48 Mcps, the nominal bandwidth value of the carrier is 0.6 MHz;

in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

The nominal bandwidth values of the carriers are selected from the first set B1. The carriers having the selected bandwidth values are borne in a preset band. The multiple selected bandwidth values may be the same or not.

The nominal channel spacing between adjacent carriers of the multiple carriers are set, and the multiple carriers are aggregated according to the set spacing. The nominal channel spacing between adjacent carriers may be set by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

Finally, the related modulation information is carried on the multiple arranged carriers for transmission.

It can be seem from above that in an embodiment of the disclosure, multiple obtained carriers are borne in a preset band, and then the multiple carriers are aggregated, to make the nominal channel spacing between adjacent carriers of the multiple carriers is integral multiples of 0.2 MHz. Thus, the carrier center can be scanned at the inter-carrier spacing granularity of 0.2 MHz of the UMTS, the performance of the less bandwidth and narrow band aggregation system is effectively improved, and existing hardware and algorithms can be reused.

Figure 3:
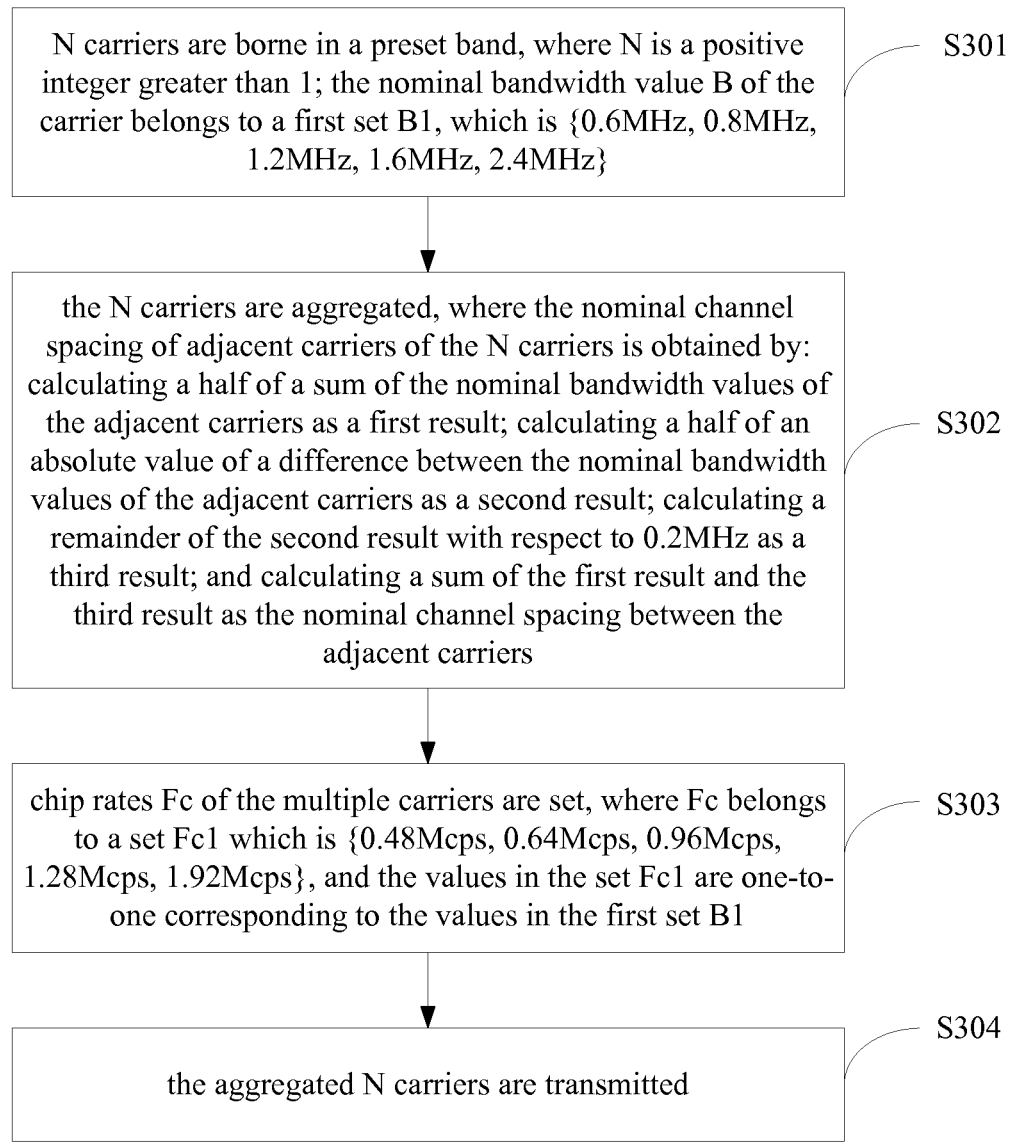
FIG. 3 is a schematic flowchart of another carrier aggregation transmission method according to an embodiment of the disclosure.

It is further provided a carrier aggregation transmission method according to an embodiment of the disclosure, as shown in FIG. 3. The method includes following steps S301 to S304.

In step S301, N carriers are borne in a preset band, where N is a positive integer greater than 1; the nominal bandwidth value B of the carrier belongs to a first set B1, which is {0.6 MHz, 0.8 MHz, 1.2 MHz, 1.6 MHz, 2.4 MHz}.

In step S302, the N carriers are aggregated, where the nominal channel spacing of adjacent carriers of the N carriers is obtained by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In step S303, chip rates Fc of the multiple carriers are set, where Fc belongs to a set Fc1 which is {0.48 Mcps, 0.64 Mcps, 0.96 Mcps, 1.28 Mcps, 1.92 Mcps}, and the values in the set Fc1 are one-to-one corresponding to the values in the first set B1.

That is to say, in a case that the chip rate Fc is 0.48 Mcps, the nominal bandwidth value of the carrier is 0.6 MHz;

in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

In step S304, the aggregated N carriers are transmitted.

Further, a subset of bandwidths, which meet B1=0.4 MHz*Nb2, are selected from the set B1, where Nb2 is a positive integer, to obtain a subset Be, which is {0.8 MHz, 1.2 MHz, 1.6 MHz, 2.4 MHz}, and the corresponding chip rate Fce, which is {0.64 Mcps, 0.96 Mcps, 1.28 Mcps, 1.92 Mcps}. The complementary set of Be Bo is {0.6 MHz}, and the corresponding chip rate Fco is {0.48 Mcps}.

The nominal bandwidth value of the carrier is selected from the first set B1, and the carrier aggregation is performed within a continuous band.

If the nominal bandwidth values of adjacent carriers belong to one subset, i.e., subset B3, or belong to the complementary set Bo, no band spacing is remained between the adjacent carriers, and the nominal channel spacing between two adjacent carriers is:

$$\text{Nominal channel spacing} = \frac{BW_{Channel(1)} + BW_{Channel(2)}}{2} \text{ [MHz]}.$$

If the nominal bandwidth values of adjacent carriers do not belong to one subset, i.e., one belongs to subset Be, and the other belongs to the complementary set Bo, the band spacing of 0.1 MHz is remained between adjacent carriers, and the nominal channel spacing between two adjacent carriers is:

$$\text{Nominal channel spacing} = \frac{BW_{Channel(1)} + BW_{Channel(2)}}{2} + 0.1 \text{ [MHz]}.$$

The two cases may be uniformly represented as:

$$\text{Nominal channel spacing} = \frac{BW_{Channel(1)} + BW_{Channel(2)}}{2} + \text{mod}\left[\frac{|BW_{Channel(1)} - BW_{Channel(2)}|}{2}, 0.2\right] \text{ [MHz]}.$$

Where $BW_{Channel(1)}$ and $BW_{Channel(2)}$ are the nominal bandwidth values of two adjacent carriers, and the normal bandwidth values belong to the first set B1, which is {0.6 MHz, 0.8 MHz, 1.2 MHz, 1.6 MHz, 2.4 MHz}, and mod indicates operation of calculating the remainder.

It can be seem from above that in an embodiment of the disclosure, multiple carriers are borne in a preset band, then the multiple carriers are aggregated, and the chip rates of the multiple carriers are set, to make the nominal channel spacing between adjacent carriers of the multiple carriers is integral multiples of 0.2 MHz. Thus, both the constrains of the channel raster of 0.2 MHz of the UMTS system and the chip rate of 3.84 Mcps are taken into account, the performance of the less bandwidth and narrow band aggregation system is effectively improved, and existing hardware and algorithms can be reused.

Figure 4:
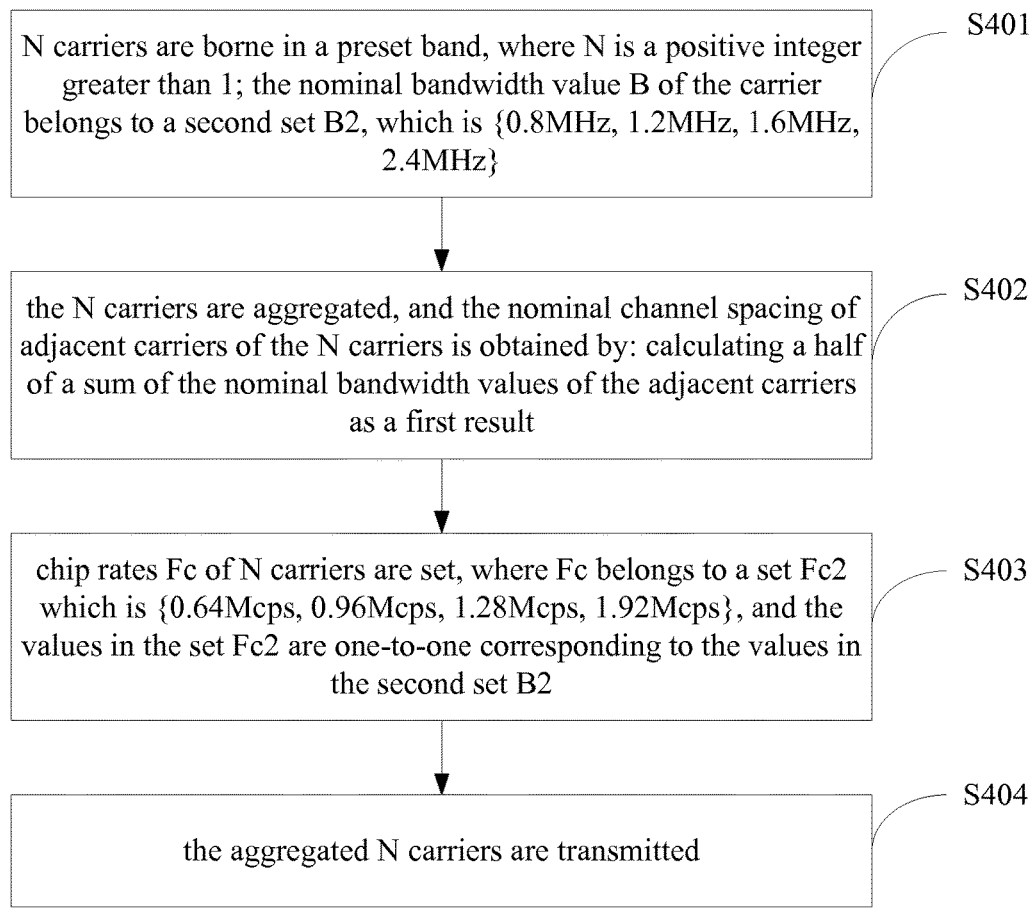
FIG. 4 is a schematic flowchart of another carrier aggregation transmission method according to an embodiment of the disclosure.

It is further provided a carrier aggregation transmission method according to an embodiment of the disclosure, as shown in FIG. 4. The method includes following steps S401 to S404.

In step S401, N carriers are borne in a preset band, where N is a positive integer greater than 1; the nominal bandwidth value B of the carrier belongs to a second set B2, which is {0.8 MHz, 1.2 MHz, 1.6 MHz, 2.4 MHz}.

In step S402, the N carriers are aggregated, and the nominal channel spacing of adjacent carriers of the N carriers is obtained by: calculating a half of a sum of the nominal bandwidth values of the adjacent carriers as a first result.

In step S403, chip rates Fc of N carriers are set, where Fc belongs to a set Fc2 which is {0.64 Mcps, 0.96 Mcps, 1.28 Mcps, 1.92 Mcps}, and the values in the set Fc2 are one-to-one corresponding to the values in the second set B2.

That is to say, in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

In step S404, the aggregated N carriers are transmitted.

It is to be noted that in an embodiment of the disclosure, a half of the sum of the nominal bandwidth values of the two adjacent carriers is calculated as the nominal channel spacing between any two adjacent carriers. For example, if 0.8 MHz and 1.2 MHz are selected from the second set B2 respectively as the nominal bandwidth values of two adjacent carriers, the nominal channel spacing between the carrier with the nominal bandwidth value of 0.8 MHz and the carrier with the nominal bandwidth value of 1.2 MHz is (0.8 MHz+1.2 MHz)/2+mod [(1.2 MHz−0.8 MHz)/2, 0.2 MHz]=1 MHz=5*0.2 MHz. If 0.8 MHz and 1.6 MHz are selected from the second set B2 respectively as the nominal bandwidth values of two adjacent carriers, the nominal channel spacing between the carrier with the nominal bandwidth value of 0.8 MHz and the carrier with the nominal bandwidth value of 1.6 MHz is (0.8 MHz+1.6 MHz)/2=1.2 MHz=6*0.2 MHz. Thus, the nominal channel spacing between adjacent carriers with any nominal bandwidth values in the second set B2 is integral multiples of 0.2 MHz.

It can be seem from above that in an embodiment of the disclosure, multiple obtained carriers are borne in a preset band, then the multiple carriers are aggregated, and the chip rates of the multiple carriers are set, to make the nominal channel spacing between adjacent carriers of the multiple carriers is integral multiples of 0.2 MHz. Thus, both the constrains of the channel raster of 0.2 MHz of the UMTS system and the chip rate of 3.84 Mcps are taken into account, the performance of the less bandwidth and narrow band aggregation system is effectively improved, and existing hardware and algorithms can be reused.

Figure 5:
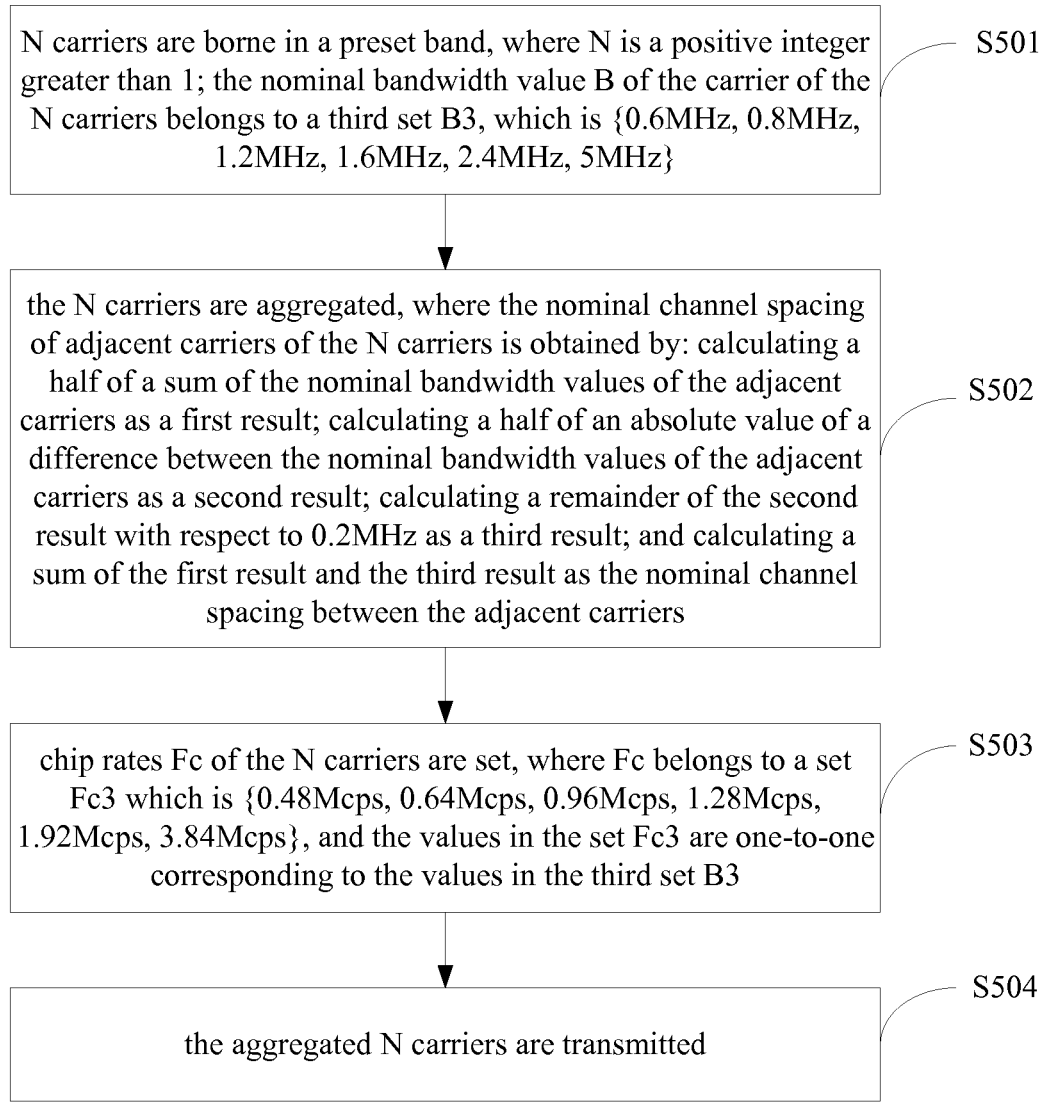
FIG. 5 is a schematic flowchart of another carrier aggregation transmission method according to an embodiment of the disclosure.

It is further provided a carrier aggregation transmission method according to an embodiment of the disclosure, as shown in FIG. 5. The method includes following steps S501 to S504.

In step S501, N carriers are borne in a preset band, where N is a positive integer greater than 1; the nominal bandwidth value B of the carrier of the N carriers belongs to a third set B3, which is {0.6 MHz, 0.8 MHz, 1.2 MHz, 1.6 MHz, 2.4 MHz, 5 MHz}.

In step S502, the N carriers are aggregated, where the nominal channel spacing of adjacent carriers of the N carriers is obtained by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In step S503, chip rates Fc of the N carriers are set, where Fc belongs to a set Fc3 which is {0.48 Mcps, 0.64 Mcps, 0.96 Mcps, 1.28 Mcps, 1.92 Mcps, 3.84 Mcps}, and the values in the set Fc3 are one-to-one corresponding to the values in the third set B3.

That is to say, in a case that the chip rate Fc is 0.48 Mcps, the nominal bandwidth value of the carrier is 0.6 MHz;

in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz;

in a case that the chip rate Fc is 1.92 Mcps, the nominal bandwidth value of the carrier is 2.4 MHz; and in a case that the chip rate Fc is 3.84 Mcps, the nominal bandwidth value of the carrier is 5 MHz.

In step S504, the aggregated N carriers are transmitted.

It is to be noted that carrier aggregation is required to be performed on a wide-band whose bandwidth is greater than 5 MHz due to diversity of requirement. The bandwidth value of 5 MHz in the embodiment of the disclosure is an option for the nominal bandwidth value of the carrier.

It can be seem from above that in an embodiment of the disclosure, N carriers are borne in a preset band, then the N carriers are aggregated, and the chip rates of the N carriers are set, to make the nominal channel spacing between adjacent carriers of the N carriers is integral multiples of 0.2 MHz. Thus, both the constrains of the channel raster of 0.2 MHz of the UMTS system and the cell rate of 3.84 Mcps are taken into account, the performance of the less bandwidth and narrow band aggregation system is effectively improved, and existing hardware and algorithms can be reused.

Figure 6:
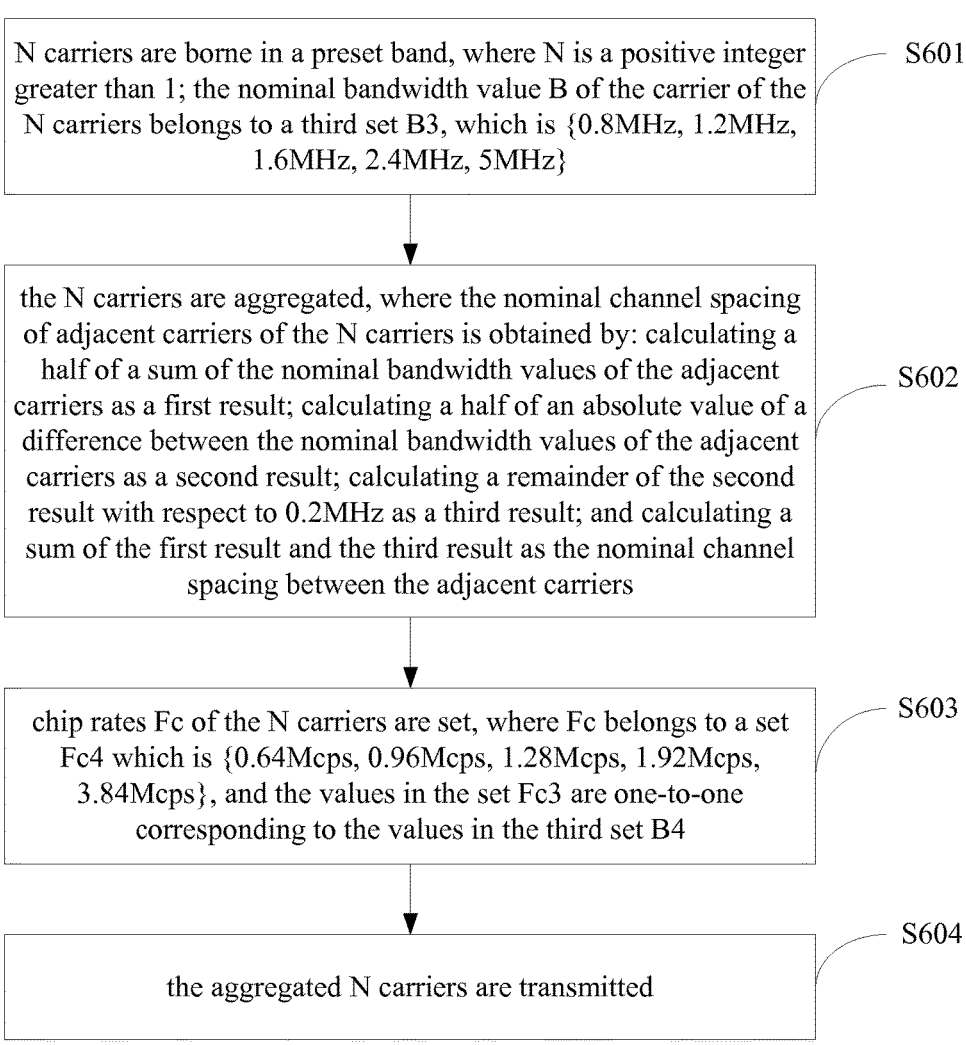
FIG. 6 is a schematic flowchart of another carrier aggregation transmission method according to an embodiment of the disclosure.

It is further provided a carrier aggregation transmission method according to an embodiment of the disclosure, as shown in FIG. 6. The method includes following steps S601 to S604.

In step S601, N carriers are borne in a preset band, where N is a positive integer greater than 1; the nominal bandwidth values B of the N carriers belong to a fourth set B4, which is {0.8 MHz, 1.2 MHz, 1.6 MHz, 2.4 MHz, 5 MHz}.

In step S602, the N carriers are aggregated, and the nominal channel spacing of adjacent carriers of the N carriers is obtained by:

calculating a half of a sum of the nominal bandwidth values of the adjacent carriers as a first result;

calculating a half of an absolute value of a difference between the nominal bandwidth values of the adjacent carriers as a second result;

calculating a remainder of the second result with respect to 0.2 MHz as a third result; and calculating a sum of the first result and the third result as the nominal channel spacing between the adjacent carriers.

In step S603, chip rates Fc of the N carriers are set, where Fc belongs to a set Fc4 which is {0.64 Mcps, 0.96 Mcps, 1.28 Mcps, 1.92 Mcps, 3.84 Mcps}, and the values in the set Fc4 are one-to-one corresponding to the values in the fourth set B4.

In a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz;

in a case that the chip rate Fc is 1.92 Mcps, the nominal bandwidth value of the carrier is 2.4 MHz; and in a case that the chip rate Fc is 3.84 Mcps, the nominal bandwidth value of the carrier is 5 MHz.

In step S604, the aggregated N carriers are transmitted.

It can be seem from above that in an embodiment of the disclosure, N carriers are borne in a preset band, then the N carriers are aggregated, and the chip rates of the N carriers are set, to make the nominal channel spacing between adjacent carriers of the N carriers is integral multiples of 0.2 MHz. Thus, both the constrains of the channel raster of 0.2 MHz of the UMTS system and the cell rate of 3.84 Mcps are taken into account, the performance of the less bandwidth and narrow band aggregation system is effectively improved, and existing hardware and algorithms can be reused.

Figure 7:
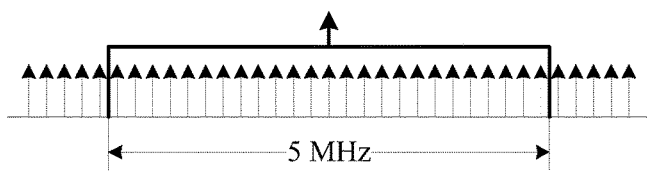
FIG. 7 is a carrier with a bandwidth of 5 MHz according to an embodiment of the disclosure.

To further understand the disclosure, the carrier aggregation on the UMTS system of legacy 5 MHz will be analyzed by referring to FIG. 7. A carrier of 5 MHz is shown in FIG. 7, where the dotted arrow denotes the channel raster of the UMTS, and the solid arrow above the block denotes the center frequency of the carrier of 5 MHz. It can be seen that the center frequency of the 5 MHz legacy carrier is on the channel raster of the UMTS.

1. The nominal bandwidth value is selected from the first set B1, the second set B2, the third set B3 or the fourth set B4, the number of the carriers is selected, to make the total bandwidth Bc after the carrier aggregation approximates 5 MHz. For example, the relative bandwidth deviation is less than 0.1. That is to say, abs(Bc−5)/5<0.1, where abs is the function for calculating the absolution.

There are multiple carrier aggregation methods which meet the above condition. For example, 0.6*8=4.8 MHz, i.e., eight less-bandwidth carriers of 0.6 MHz are aggregated; or 0.8*6=4.8 MHz, i.e., six less-bandwidth carriers of 0.8 MHz are aggregated; or 0.6*7+0.8=5 MHz, i.e., seven small carriers of 0.6 MHz and one small carrier of 0.8 MHz are aggregated; or 1.2*4=4.8 MHz, i.e., four small carriers of 1.2 MHz are aggregated; or 1.2*3+1.6=5.2 MHz, i.e., three small carriers of 1.2 MHz and one small carrier of 1.6 MHz are aggregated.

2. The multiple small carriers are aggregated for transmission.

Figure 8:
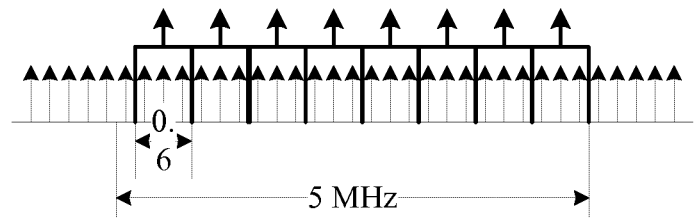
FIG. 8 is a schematic diagram illustrating carrier aggregation on a bandwidth of 5 MHz according to an embodiment of the disclosure.

For example, in the method of 0.6*8=4.8 MHz, referring to the carrier deployment shown in FIG. 8, the center frequencies of each of the carriers may be located on the channel raster. The selected nominal bandwidth value is integral multiples of 0.2 MHz, but not integral multiples of 0.4 MHz, and the nominal bandwidth values of adjacent carriers are the same value, i.e. 0.6 MHz. Thus, the adjacent carriers are arranged closely, and the spacing between adjacent carriers is integral multiples of 0.2 MHz. To locate the center frequencies of each carriers of 0.6 MHz on the channel raster, all the carriers needs to be shifted by 0.1 MHz. Thus, the redundant 0.2 MHz cannot be remained at two ends of the bandwidth of legacy 5 MHz uniformly, and the redundant 0.2 MHz only can be remained on one end. With this, the spacing between adjacent carriers is (0.6+0.6)/2=0.6 MHz.

Figure 9:
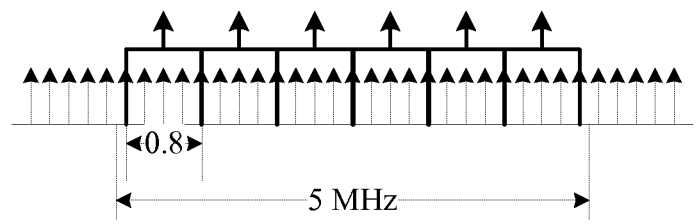
FIG. 9 is a schematic diagram illustrating another carrier aggregation on a bandwidth of 5 MHz according to an embodiment of the disclosure.

Further, for example, in the method of 0.8*6=4.8 MHz, referring to the carrier deployment shown in FIG. 9, the center frequencies of each of the carriers may be located on the channel raster. The selected nominal bandwidth value is integral multiples of 0.4 MHz, and then must be integral multiples of 0.2 MHz. Thus, the four adjacent carriers are arranged closely. Further, the bandwidth after the aggregation is a little less than 5 MHz, i.e., by 0.2 MHz. Thus, 0.1 MHz can be remained at two ends of the bandwidth of legacy 5 MHz, for eliminating the interference between adjacent bands. With this, the spacing between adjacent carriers is (0.8+0.8)/2=0.8 MHz.

Figure 10:
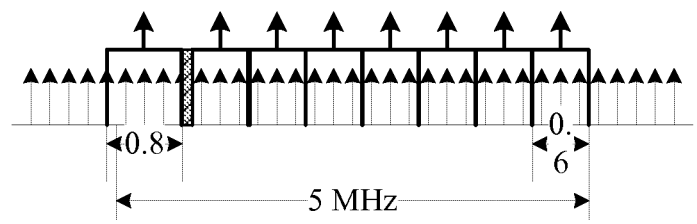
FIG. 10 is a schematic diagram illustrating another carrier aggregation on a bandwidth of 5 MHz according to an embodiment of the disclosure.

Further, for example, in the method of 0.6*7+0.8=5 MHz, referring to the carrier deployment shown in FIG. 10, the center frequencies of each of the carriers may be located on the channel raster. Between the carrier of 0.8 MHz and the carrier of 0.6 MHz, a spacing of 0.1 MHz must be remained, for locating the center frequencies of both carriers on the channel raster. Due to this spacing of 0.1 MHz, the total bandwidth after the aggregation is increased by 0.1 MHz, i.e., the total bandwidth after the aggregation is 5 MHz. With this, the spacing between the carrier of 0.8 MHz and the carrier of 0.6 MHz is 0.1+(0.8+0.6)/2=0.8 MHz.

Figure 11:
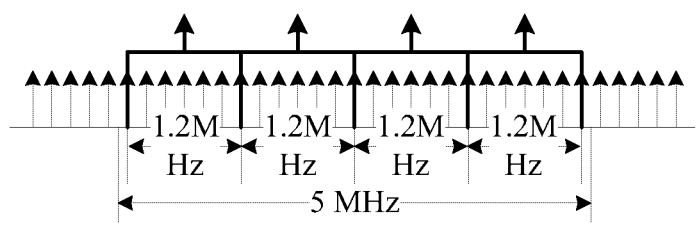
FIG. 11 is a schematic diagram illustrating another carrier aggregation on a bandwidth of 5 MHz according to an embodiment of the disclosure.

Further, for example, in the method of 1.2*4=4.8 MHz, referring to the carrier deployment shown in FIG. 11, the center frequencies of each of the carriers may be located on the channel raster. The selected nominal bandwidth value is integral multiples of 0.4 MHz, and then must be integral multiples of 0.2 MHz. Thus, the four adjacent carriers are arranged closely. Further, the bandwidth after the aggregation is a little less than 5 MHz, i.e., by 0.2 MHz. Thus, 0.1 MHz can be remained at two ends of the bandwidth of legacy 5 MHz, for eliminating the interference between adjacent bands. With this, the spacing between adjacent carriers is (1.2+1.2)/2=1.2 MHz.

Figure 12:
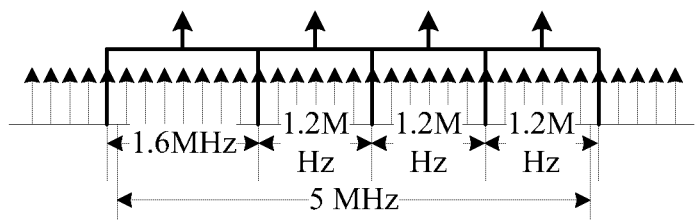
FIG. 12 is a schematic diagram illustrating another carrier aggregation on a bandwidth of 5 MHz according to an embodiment of the disclosure.

Further, for example, in the method of 1.2*3+1.6=5.2 MHz, referring to the carrier deployment shown in FIG. 12, the center frequencies of each of the carriers may be located on the channel raster. The selected nominal bandwidth value is integral multiples of 0.4 MHz, and then must be integral multiples of 0.2 MHz. Thus, the four adjacent carriers are arranged closely. Further, the bandwidth after the aggregation is a little greater than 5 MHz (by 0.2 MHz). Thus, 0.1 MHz can be remained at two ends of the bandwidth of legacy 5 MHz. With this, the spacing between the carrier of 1.6 MHz and the carrier of 1.2 MHz is (1.6+1.2)/2=1.4 MHz.

To eliminate the interference between bands, the nominal bandwidth value of the carrier is selected from the first set B1 for performing the carrier aggregation on the 5 MHz legacy carrier.

Figure 13:
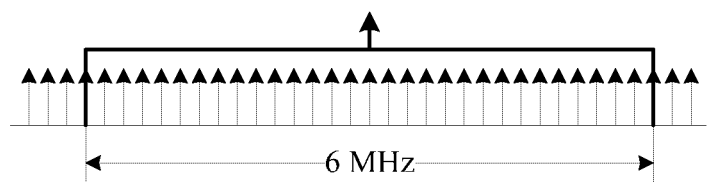
FIG. 13 is a carrier with a bandwidth of 6 MHz according to an embodiment of the disclosure.

It is assumed that carriers with non-standard bandwidth are aggregated for transmission. For example, for the continuous bandwidth of 6 MHz as shown in FIG. 13, if only 5 MHz bandwidth is deployed in the UMTS system, the redundant 1 MHz bandwidth cannot be used, resulting in waste of resource. In conjunction with the above carrier aggregation transmission method, the bandwidth will be made full use of as follow.

In a first method, the 6 MHz bandwidth is completely used for carrier UMTS. That is to say, the nominal bandwidth value is selected from the first set B1, the second set B2, the third set B3 or the fourth set B4, and the number of the carriers is selected, so that the total bandwidth Bc after the carrier aggregation approximates the target bandwidth, such as 6 MHz. For example, the relative bandwidth deviation is less than 0.1 MHz, i.e., abs(Bc−6)/6<0.1.

There are multiple carrier aggregation methods which meet the above condition. For example, 0.6*10=6 MHz, i.e., ten carriers of 0.6 MHz are aggregated; or 1.2*5=6 MHz, i.e., five carriers of 1.2 MHz are aggregated;

after the number of the carriers and the corresponding nominal bandwidth value are selected, the multiple carriers are aggregated for transmission.

Figure 14:
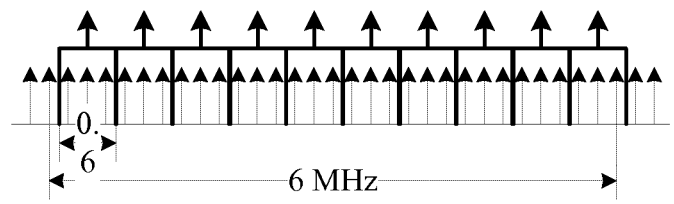
FIG. 14 is a schematic diagram illustrating a carrier aggregation on a bandwidth of 6 MHz according to an embodiment of the disclosure.

For example, in the method of 0.6*10=6 MHz, referring to the carrier deployment shown in FIG. 14, the center frequencies of each of the carriers may be located on the channel raster. The selected bandwidth value is integral multiples of 0.2 MHz, but not integral multiples of 0.4 MHz, and the nominal bandwidth values of adjacent carriers are the same value (0.6 MHz). Thus, the adjacent carriers are arranged closely, and the spacing between adjacent carriers is integral multiples of 0.2 MHz. To locate the center frequencies of each of the carriers of 0.6 MHz on the channel raster, all the carriers needs to be shifted by 0.1 MHz. Thus, 0.1 MHz will be redundant at a certain segment of the band, and the total bandwidth after the aggregation is 6.1 MHz actually.

Figure 15:
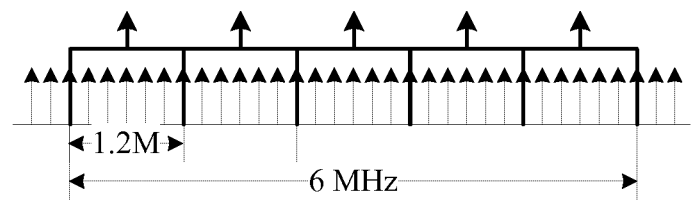
FIG. 15 is a schematic diagram illustrating another carrier aggregation on a bandwidth of 6 MHz according to an embodiment of the disclosure.

Further, for example, in the method of 1.2*5=6 MHz, referring to the carrier deployment shown in FIG. 15, the center frequencies of each of the carriers may be located on the channel raster. The selected bandwidth value is integral multiples of 0.4 MHz. Thus, the adjacent carriers are arranged closely, and the spacing between adjacent carriers is integral multiples of 0.2 MHz. The total bandwidth after the aggregation is 6.0 MHz actually.

In a second method, in the 6 MHz bandwidth, a legacy bandwidth, such as 5 MHz is deployed firstly in a UMTS system, and then the carrier aggregation is performed on the remained bandwidth. The nominal bandwidth value of the carrier is selected from B1 or B2. In implementation, a technology of bandwidth compression may be adopted. For example, a small shaping filter factor may be used, so that the legacy bandwidth that is deployed in the UMTS system actually is less than 5 MHz, such as 4.8 MHz, 4.6 MHz, or even 4.2 MHz. Some embodiments are provided below.

4.6+1.2=5.8 MHz, i.e., one carrier of 5 MHz to be compressed (which is compressed to be 4.6 MHz) and one carrier of 1.2 MHz are aggregated; or 4.6+0.6*2=5.8 MHz, i.e., one carrier of 5 MHz to be compressed (which is compressed to be 4.6 MHz) and two carriers of 0.6 MHz are aggregated; or 4.8+1.2=6 MHz, i.e., one carrier of 5 MHz to be compressed (which is compressed to be 4.8 MHz) and one carrier of 1.2 MHz are aggregated; or 4.8+0.6*2=5.8 MHz, i.e., one carrier of 5 MHz to be compressed (which is compressed to be 4.8 MHz) and two carriers of 0.6 MHz are aggregated; or 5+1.2=6.2 MHz, i.e., one uncompressed carrier of 5 MHz and one carrier of 1.2 MHz are aggregated; or 5+0.8=5.8 MHz, i.e., one uncompressed carrier of 5 MHz and one carrier of 0.8 MHz are aggregated;

after the number of the carriers and the corresponding nominal bandwidth value are selected, the multiple carriers are aggregated for transmission.

Figure 16:
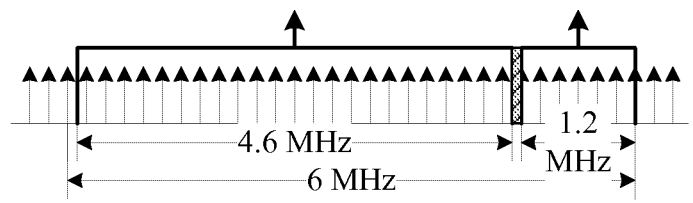
FIG. 16 is a schematic diagram illustrating another carrier aggregation on a bandwidth of 6 MHz according to an embodiment of the disclosure.

For example, in the method of 4.6+1.2=5.8 MHz, referring to the carrier deployment shown in FIG. 16, the center frequencies of each of the carriers may be located on the channel raster. 4.6 MHz is not integral multiples of 0.4 MHz, and 1.2 MHz is integral multiples of 0.4 MHz, thus a spacing of 0.1 MHz needs to be remained between the carrier of 4.6 MHz and the carrier of 1.2 MHz, so that the center frequencies of both the carriers are located on the channel raster.

Figure 17:
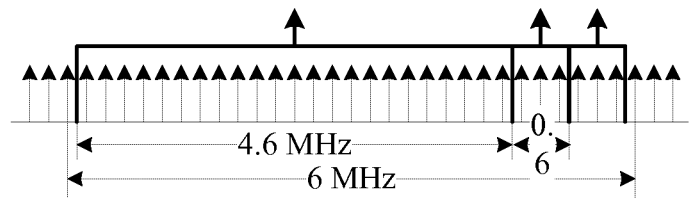
FIG. 17 is a schematic diagram illustrating another carrier aggregation on a bandwidth of 6 MHz according to an embodiment of the disclosure.

Further, for example, in the method of 4.6+0.6*2=5.8 MHz, referring to the carrier deployment shown in FIG. 17, the center frequencies of each of the carriers may be located on the channel raster. 4.6 MHz and 0.6 MHz each are integral multiples of 0.2 MHz. Thus, the adjacent carriers are arranged closely.

Figure 18:
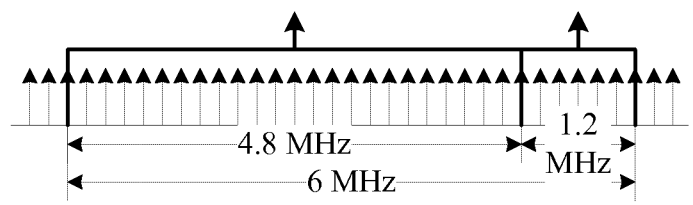
FIG. 18 is a schematic diagram illustrating another carrier aggregation on a bandwidth of 6 MHz according to an embodiment of the disclosure.

Further, for example, in the method of 4.8+1.2=6.0 MHz, referring to the carrier deployment shown in FIG. 18, the center frequencies of each of the carriers may be located on the channel raster. The selected bandwidth value is integral multiples of 0.4 MHz. Thus, the adjacent carriers are arranged closely, and the spacing between adjacent carriers is integral multiples of 0.2 MHz.

Figure 19:
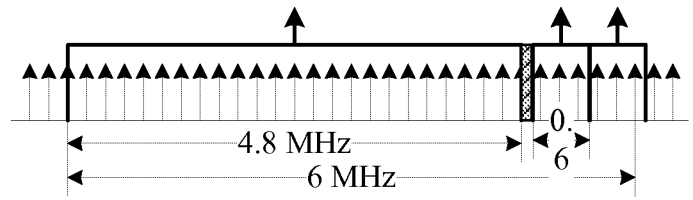
FIG. 19 is a schematic diagram illustrating another carrier aggregation on a bandwidth of 6 MHz according to an embodiment of the disclosure.

Further, for example, in the method of 4.8+0.6*2=6.0 MHz, referring to the carrier deployment shown in FIG. 19, the center frequencies of each of the carriers may be located on the channel raster.

Figure 20:
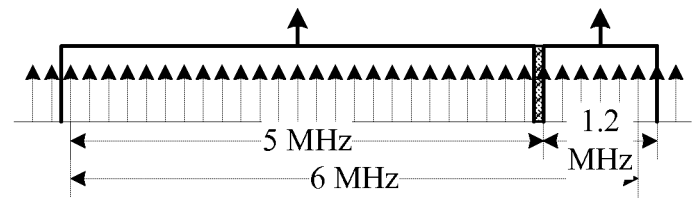
FIG. 20 is a schematic diagram illustrating another carrier aggregation on a bandwidth of 6 MHz according to an embodiment of the disclosure.

Further, for example, in the method of 5+1.2=6.2 MHz, referring to the carrier deployment shown in FIG. 20, the center frequencies of each of the carriers may be located on the channel raster.

Figure 21:
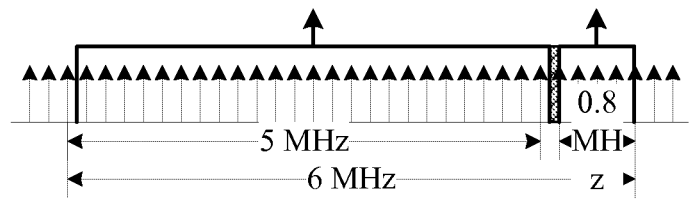
FIG. 21 is a schematic diagram illustrating another carrier aggregation on a bandwidth of 6 MHz according to an embodiment of the disclosure.

Further, for example, in the method of 5+0.8=5.8 MHz, referring to the carrier deployment shown in FIG. 21, the center frequencies of each of the carriers may be located on the channel raster.

It is further provided an apparatus for implementing carrier aggregation transmission in an embodiment of the disclosure. The apparatus includes a bearing module, an aggregation module and a transmission module.

The bearing module is configured to bear N carriers in a preset band, where N is a positive integer greater than 1, and a nominal bandwidth value of the carrier is less than or equal to 5 MHz.

The aggregation module is configured to aggregate the N carriers, to make nominal channel spacing between adjacent carriers of the N carriers is integral multiples of 0.2 MHz.

The transmission module is configured to transmit the N aggregated carriers from the aggregation module.

It is to be noted that to aggregate, by the aggregation module, the N carriers is to arrange, by the aggregation module, the N carriers in the bands in accordance with the constrains of the specific spacing between the centers of the carriers after the modulation information is borne on the N carriers.

The bearing module, the aggregation module and the transmission module described above are connected in sequence.

Further, the chip rates Fc of the N carriers, the forming filter factor Fsp and the nominal bandwidth value B of the carrier meet the following conditions:

Fc=3.84 Mcps/Nc, where Nc is a positive integer, and Nc={2, 3, 4, 5, 6, 7, 8, 9, 10}. B=Fc*Fsp, and B=0.2 MHz*Nb1, where Nb1 is a positive integer.

A nominal bandwidth value that meets both B=Fc*Fsp and B=0.2 MHz*Nb1 can be used as the nominal bandwidth value of the carrier. For example, the set B1 is {0.6 MHz, 0.8 MHz, 1.2 MHz, 1.6 MHz, 2.4 MHz}, and the corresponding chip rate Fc1 is {0.48 Mcps, 0.64 Mcps, 0.96 Mcps, 1.28 Mcps, 1.92 Mcps}. The set B1 may be divided into a subset Be which is {0.8 MHz, 1.2 MHz, 1.6 MHz, 2.4 MHz}, and a complementary set Bo which is {0.6 MHz}.

If the nominal bandwidth values of the carriers are selected from one subset, that is, the nominal bandwidth values each belong to the subset Be or each belong to the complementary set Bo, the spacing between the center frequencies of two adjacent carriers is a half of the sum of the nominal bandwidth values of the two adjacent carriers. If the nominal bandwidth values of the carriers are selected from different subsets, that is, one of the nominal bandwidth values belong to the subset Be and the other of the nominal bandwidth values belong to the complementary set Bo, the spacing between the center frequencies of two adjacent carriers is the sum of the band spacing of 0.1 MHz and a half of the sum of the nominal bandwidth values of the two adjacent carriers. Therefore, any two values are selected from the set B1 as the nominal bandwidth values of the carriers, the spacing between the center frequencies of any two carriers of the N carriers is integral multiples of 0.2 MHz.

It can be seen from above that in the apparatus for implementing carrier aggregation transmission according to the embodiment of the disclosure, the bearing module is configured to bear multiple carriers in preset a band, the aggregation module is configured to aggregate the multiple carriers, to make the nominal channel spacing between adjacent carriers of the multiple carriers is integral multiples of 0.2 MHz. And the chip rates of the multiple carriers are set. Thus, both the constrains of the channel raster of 0.2 MHz of the UMTS system and the chip rate of 3.84 Mcps are taken into account, the performance of the less bandwidth and narrow band aggregation system is effectively improved, and existing hardware and algorithms can be reused.

Figure 22:
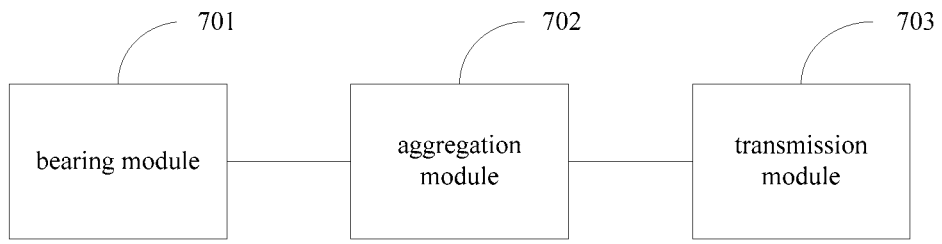
FIG. 22 is a schematic structural diagram of an apparatus for implementing carrier aggregation transmission according to an embodiment of the disclosure.

It is further provided an apparatus for implementing carrier aggregation transmission in an embodiment of the disclosure. Referring to FIG. 22, the apparatus includes a bearing module 701, an aggregation module 702 and a transmission module 703.

The bearing module 701 is configured to bear N carriers in preset a band, where N is a positive integer greater than 1, and a nominal bandwidth value of the carrier is less than or equal to 5 MHz.

The aggregation module 702 is configured to aggregate the N carriers, to make nominal channel spacing between adjacent carriers of the N carriers is integral multiples of 0.2 MHz.

The transmission module 703 is configured to transmit the N aggregated carriers from the aggregation module 702.

Further, the nominal bandwidth values B of the N carriers belong to a first set B1. The first set B1 is {0.6 MHz, 0.8 MHz, 1.2 MHz, 1.6 MHz, 2.4 MHz}.

Figure 23:
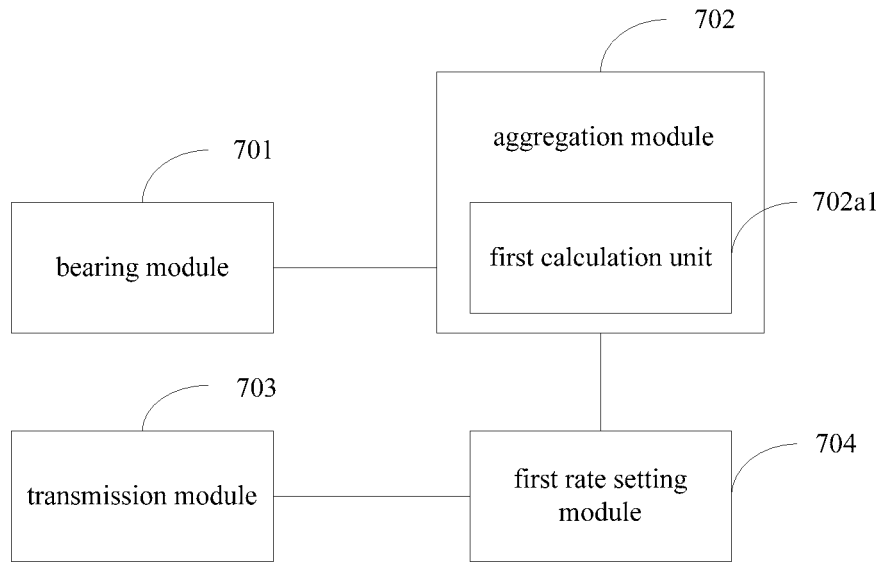
FIG. 23 is a schematic structural diagram of another apparatus for implementing carrier aggregation transmission according to an embodiment of the disclosure.

Referring to FIG. 23, the aggregation module 702 includes a first calculation unit 702a1 configured to calculate the nominal channel spacing between the adjacent carriers based on the nominal bandwidth values of the N carriers in the preset band. Specifically, the first calculation unit 702a1 calculates a half of a sum of the nominal bandwidth values of the adjacent carriers as a first result; calculates a half of an absolute value of a difference between the nominal bandwidth values of the adjacent carriers as a second result; calculates a remainder of the second result with respect to 0.2 MHz as a third result; and calculates a sum of the first result and the third result as the nominal channel spacing between the adjacent carriers.

The apparatus for implementing carrier aggregation transmission according to this embodiment further includes a first rate setting module 704. The first rate setting module 704 is configured to set the chip rates Fc of the N carriers. The chip rates Fc belong to a set Fc1 which is {0.48 Mcps, 0.64 Mcps, 0.96 Mcps, 1.28 Mcps, 1.92 Mcps}, and the values in the set Fc1 are one-to-one corresponding to the values in the first set B1.

That is to say, in a case that the chip rate Fc is 0.48 Mcps, the nominal bandwidth value of the carrier is 0.6 MHz;

in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

Alternatively, nominal bandwidth values B of the N carriers belong to a second set B2. The second set B2 is {0.8 MHz, 1.2 MHz, 1.6 MHz, 2.4 MHz}.

Figure 24:
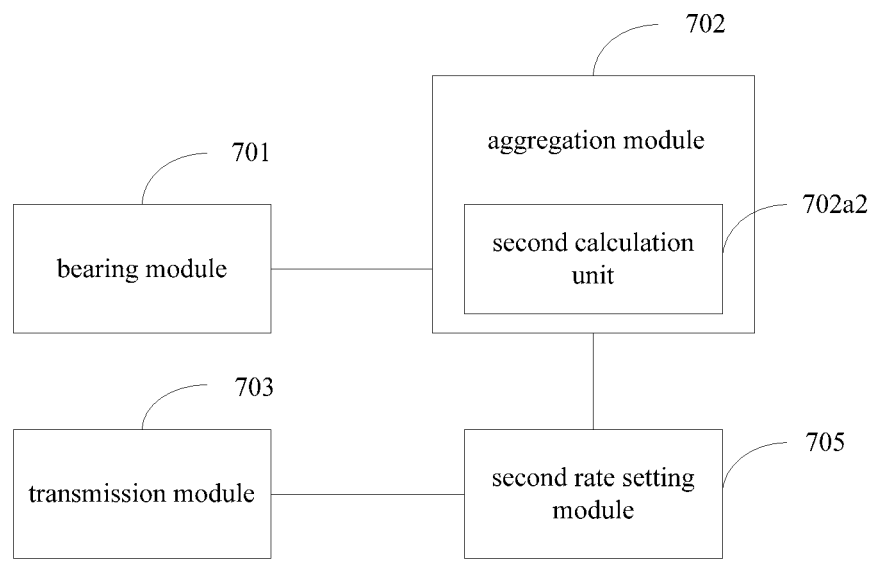
FIG. 24 is a schematic structural diagram of another apparatus for implementing carrier aggregation transmission according to an embodiment of the disclosure.

Referring to FIG. 24, the aggregation module 702 includes a second calculation unit 702a2 configured to calculate the nominal channel spacing between the adjacent carriers based on the nominal bandwidth values of the N carriers in the preset band. Specifically, the second calculation unit 702a2 calculates a half of a sum of the nominal bandwidth values of the adjacent carriers as the nominal channel spacing between the adjacent carriers.

The apparatus for implementing carrier aggregation transmission according to this embodiment further includes a second rate setting module 705. The second rate setting module 705 is configured to set the chip rates Fc of the N carriers. The chip rates Fc belong to a set Fc2 which is {0.64 Mcps, 0.96 Mcps, 1.28 Mcps, 1.92 Mcps}, and the values in the set Fc2 are one-to-one corresponding to the values in the second set B2.

That is to say, in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz; and in a case that the chip rate Fc is 1.92 Mcps, the nominal bandwidth value of the carrier is 2.4 MHz.

Alternatively, the nominal bandwidth values B of the N carriers belong to a third set B3. The third set B3 is {0.6 MHz, 0.8 MHz, 1.2 MHz, 1.6 MHz, 2.4 MHz, 5 MHz}.

Figure 25:
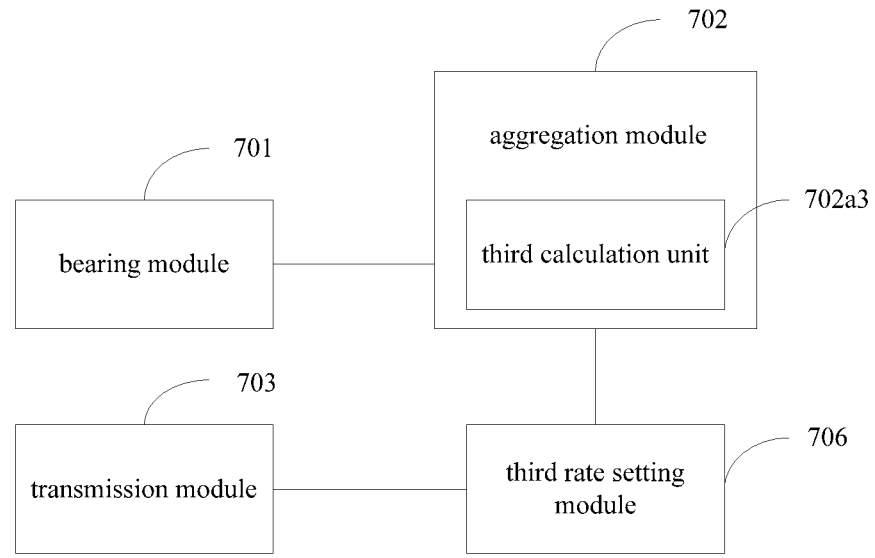
FIG. 25 is a schematic structural diagram of another apparatus for implementing carrier aggregation transmission according to an embodiment of the disclosure.

Referring to FIG. 25, the aggregation module 702 includes a third calculation unit 702a3 configured to calculate the nominal channel spacing between the adjacent carriers based on the nominal bandwidth values of the N carriers in the preset band. Specifically, the third calculation unit 702a3 calculates a half of a sum of the nominal bandwidth values of the adjacent carriers as a first result; calculates a half of an absolute value of a difference between the nominal bandwidth values of the adjacent carriers as a second result; calculates a remainder of the second result with respect to 0.2 MHz as a third result; and calculates a sum of the first result and the third result as the nominal channel spacing between the adjacent carriers.

The apparatus for implementing carrier aggregation transmission according to this embodiment further includes a third rate setting module 706. The third rate setting module 706 is configured to set the chip rates Fc of the N carriers. The chip rates Fc belong to a set Fc3 which is {0.48 Mcps, 0.64 Mcps, 0.96 Mcps, 1.28 Mcps, 1.92 Mcps, 3.84 Mcps}, and the values in the set Fc3 are one-to-one corresponding to the values in the third set B3.

That is to say, in a case that the chip rate Fc is 0.48 Mcps, the nominal bandwidth value of the carrier is 0.6 MHz;

in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz;

in a case that the chip rate Fc is 1.92 Mcps, the nominal bandwidth value of the carrier is 2.4 MHz; and in a case that the chip rate Fc is 3.84 Mcps, the nominal bandwidth value of the carrier is 5 MHz.

Alternatively, the nominal bandwidth values B of the N carriers belong to a third set B3. The third set B3 is {0.8 MHz, 1.2 MHz, 1.6 MHz, 2.4 MHz, 5 MHz}.

Figure 26:
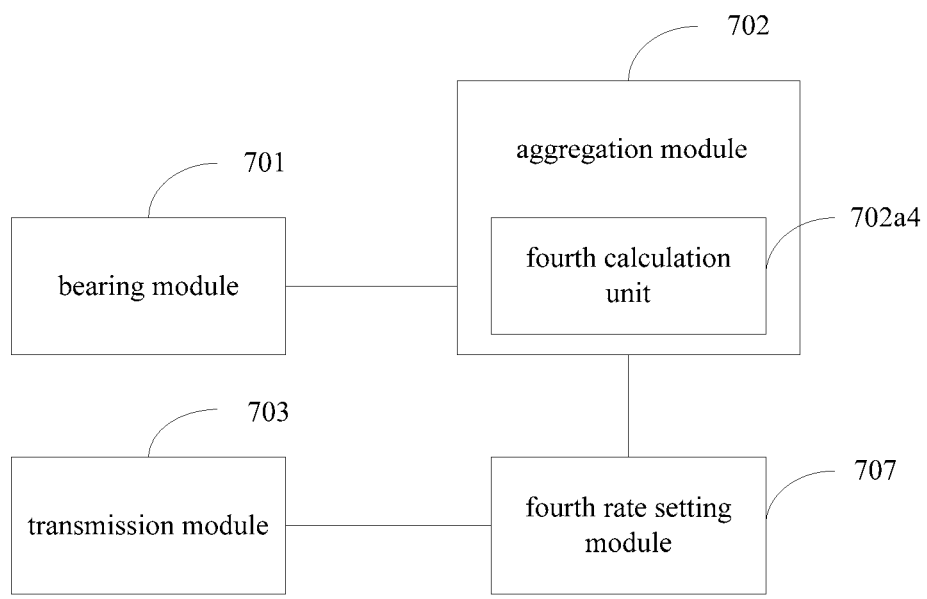
FIG. 26 is a schematic structural diagram of another apparatus for implementing carrier aggregation transmission according to an embodiment of the disclosure.

Referring to FIG. 26, the aggregation module 702 includes a fourth calculation unit 702a4 configured to calculate the nominal channel spacing between the adjacent carriers based on the nominal bandwidth values of the N carriers in the preset band. Specifically, the fourth calculation unit 702a4 calculates a half of a sum of the nominal bandwidth values of the adjacent carriers as a first result; calculates a half of an absolute value of a difference between the nominal bandwidth values of the adjacent carriers as a second result; calculates a remainder of the second result with respect to 0.2 MHz as a third result; and calculates a sum of the first result and the third result as the nominal channel spacing between the adjacent carriers.

The apparatus for implementing carrier aggregation transmission according to this embodiment further includes a fourth rate setting module 707. The fourth rate setting module 707 is configured to set the chip rates Fc of the N carriers. The chip rates Fc belong to a set Fc4 which is {0.64 Mcps, 0.96 Mcps, 1.28 Mcps, 1.92 Mcps, 3.84 Mcps}, and the values in the set Fc4 are one-to-one corresponding to the values in the fourth set B4.

That is to say, in a case that the chip rate Fc is 0.64 Mcps, the nominal bandwidth value of the carrier is 0.8 MHz;

in a case that the chip rate Fc is 0.96 Mcps, the nominal bandwidth value of the carrier is 1.2 MHz;

in a case that the chip rate Fc is 1.28 Mcps, the nominal bandwidth value of the carrier is 1.6 MHz;

in a case that the chip rate Fc is 1.92 Mcps, the nominal bandwidth value of the carrier is 2.4 MHz; and in a case that the chip rate Fc is 3.84 Mcps, the nominal bandwidth value of the carrier is 5 MHz.

It can be seen from above that in the apparatus for implementing carrier aggregation transmission according to the embodiment of the disclosure, the bearing module 701 is configured to bear N carriers in a preset band, the aggregation module 702 is configured to aggregate the N carriers, to make the nominal channel spacing between adjacent carriers of the N carriers is integral multiples of 0.2 MHz. And the chip rates of the multiple carriers are set. Thus, both the constrains of the channel raster of 0.2 MHz of the UMTS system and the cell rate of 3.84 Mcps are taken into account, the performance of the less bandwidth and narrow band aggregation system is effectively improved, and existing hardware and algorithms can be reused.

It is further provided an apparatus for implementing carrier aggregation transmission in an embodiment of the disclosure. The apparatus includes an inputting device, an outputting device, a storage apparatus and a processor.

The processor is configured to perform steps of: bearing N carriers in a preset band, where N is a positive integer greater than 1, and a nominal bandwidth value of the carrier is less than or equal to 5 MHz; and aggregating the N carriers, to make nominal channel spacing between adjacent carriers of the N carriers is integral multiples of 0.2 MHz.

The outputting device is configured to transmit the N aggregated carriers from the aggregation module.

Further, a chip rate Fc of the carrier borne in the preset band by the processor is equal to 3.84 Mega chips per second Mcps divided by Nc, where Nc is a positive integer.

A shaping filter factor Fsp of the carrier ranges from 1.2 to 1.3.

A nominal bandwidth value B of the carrier is equal to Fc multiplied by Fsp, and is integral multiples of 0.2 MHz.

Further, a nominal bandwidth value B of the carrier borne in the preset band by the processor belongs to a first set B1 and the first set B1 is {0.6 MHz, 0.8 MHz, 1.2 MHz, 1.6 MHz, 2.4 MHz}.

Further, the processor is further configured to: calculate a half of a sum of the nominal bandwidth values of the adjacent carriers as a first result; calculate a half of an absolute value of a difference between the nominal bandwidth values of the adjacent carriers as a second result; calculate a remainder of the second result with respect to 0.2 MHz as a third result; and calculate a sum of the first result and the third result as the nominal channel spacing between the adjacent carriers.

It can be seen from above that in the apparatus for implementing carrier aggregation transmission according to the embodiment of the disclosure, the processor is configured to bear N carriers in a preset band, and aggregate the N carriers, to make the nominal channel spacing between adjacent carriers of the N carriers is integral multiples of 0.2 MHz. And the processor is further configured to set the chip rates of the multiple carriers. Thus, both the constrains of the channel raster of 0.2 MHz of the UMTS system and the chip rate of 3.84 Mcps are taken into account, the performance of the less bandwidth and narrow band aggregation system is effectively improved, and existing hardware and algorithms can be reused.

Further, the user terminal is configured to receive the carrier aggregation signal provided in the embodiment of the disclosure as follow.

The Access Procedure of the Terminal

Upon being powered on, the terminal performs frequency search. If there is historical frequency information or a preset frequency list, the search is performed in accordance with the historical frequency information or preset frequency list; or else the frequency scan is performed within the legal band at an interval of 0.2 MHz.

For any scanned frequency, the detection is performed under different bandwidth assumptions. For example, the bandwidth of the carrier corresponding to the current frequency may belong to any value in the set B2 or B3. There may be a certain relation between the bandwidth and the frequency, so that a certain bandwidth value is searched only on some specific frequencies, or some bandwidth values do not need to be searched.

After the synchronous channels are detected and are synchronized with the carrier corresponding to the current frequency, the system broadcast message of the carrier is read. The system broadcast message may include the configuration information of adjacent carriers, such as the frequency and bandwidth value information of adjacent carriers.

Based on the requirement of the terminal, such as the preferred bandwidth value, and in conjunction with the broadcasting of the information of the adjacent carriers by the current carrier, the terminal selects suitable frequency for initiating a random access procedure.

Reception of the Carrier Information by the Terminal

After the terminal accesses the system, the data can be transmitted on the multiple aggregated carriers, or be transmitted selectively on the aggregated carriers. For example, for a system with six aggregated carriers of 0.8 MHz, one data block may be transmitted on the carrier on which one or more channel coefficients are optimized, to obtain frequency selectively gain. Alternatively, one data block may be transmitted on multiple 0.8 MHz carriers in parallel to obtain frequency diversity gain. The terminal obtains the scheduling information of respective aggregated carriers from the main access carrier, and receives the downlink data according to the scheduling information, or sends the uplink data.

It is to be understood by those skilled in the art that a part or all of the steps of the methods in the above embodiments may be implemented by instructing related hardware by a program. The program may be stored in a computer readable medium, which may include a read only memory (ROM, Read Only Memory), a random access memory (RAM, Random Access Memory), a magnetic disk, an optical disk and the like.

Further, in the above embodiments, the embodiment is described by placing particular emphasis on some aspect. For some part of the embodiment that is not described in detail, reference may be made to the related description in other embodiments.

The carrier aggregation transmission method and the apparatus for implementing carrier aggregation transmission according to the embodiment of the disclosure have been described in detail above. The principles and the embodiments of the disclosure are described using specific examples herein. The above descriptions of the embodiments are only intended to help understanding the method and its core idea of the disclosure. Modifications may be made to the specific embodiments or the application range by those skilled in the art according to the idea of the disclosure. In summary, the content of the specification should not be interpreted as to limit the disclosure.

What is claimed is:

1. A carrier aggregation transmission method, comprising:
bearing N carriers in a preset band, wherein N is a positive integer greater than 1, and a nominal bandwidth value of the N carriers is less than or equal to 5 MHz;
aggregating the N carriers, to make nominal channel spacing between adjacent carriers among the N carriers an integral multiple of 0.2 MHz; and
transmitting the N aggregated carriers,
wherein a chip rate (Fc) of each carrier is equal to 3.84 Mega chips per second (Mcps) divided by Nc, wherein Nc is a positive integer;
a shaping filter factor (Fsp) of each carrier ranges from 1.2 to 1.3; and
a nominal bandwidth value B of each carrier is equal to Fc multiplied by Fsp, and is an integral multiple of 0.2 MHz.

2. The method according to claim 1, wherein a nominal bandwidth value B of each carrier belongs to a first set B1 and the first set B1 is {0.6 MHz, 0.8 MHz, 1.2 MHz, 1.6 MHz, 2.4 MHz}.

3. The method according to claim 2, wherein the nominal channel spacing between the adjacent carriers is obtained by:
calculating a half of a sum of the nominal bandwidth values of the adjacent carriers as a first result;
calculating a half of an absolute value of a difference between the nominal bandwidth values of the adjacent carriers as a second result;
calculating a remainder of the second result with respect to 0.2 MHz as a third result; and
calculating a sum of the first result and the third result as the nominal channel spacing between the adjacent carriers.

4. The method according to claim 1, wherein a nominal bandwidth value B of each carrier belongs to a second set B2 and the second set B2 is {0.8 MHz, 1.2 MHz, 1.6 MHz, 2.4 MHz}.

5. The method according to claim 4, wherein the nominal channel spacing between the adjacent carriers is equal to a half of a sum of the nominal bandwidth values of the adjacent carriers.

6. The method according to claim 1, wherein a nominal bandwidth value B of each carrier belongs to a third set B3 and the third set B3 is {0.6 MHz, 0.8 MHz, 1.2 MHz, 1.6 MHz, 2.4 MHz, 5 MHz}.

7. The method according to claim 6, wherein the nominal channel spacing between the adjacent carriers is obtained by:
calculating a half of a sum of the nominal bandwidth values of the adjacent carriers as a first result;
calculating a half of an absolute value of a difference between the nominal bandwidth values of the adjacent carriers as a second result;
calculating a remainder of the second result with respect to 0.2 MHz as a third result; and
calculating a sum of the first result and the third result as the nominal channel spacing between the adjacent carriers.

8. The method according to claim 1, wherein a nominal bandwidth value B of each carrier belongs to a fourth set B4 and the fourth set B4 is {0.8 MHz, 1.2 MHz, 1.6 MHz, 2.4 MHz, 5 MHz}.

9. The method according to claim 8, wherein the nominal channel spacing between the adjacent carriers is obtained by:
calculating a half of a sum of the nominal bandwidth values of the adjacent carriers as a first result;
calculating a half of an absolute value of a difference between the nominal bandwidth values of the adjacent carriers as a second result;
calculating a remainder of the second result with respect to 0.2 MHz as a third result; and
calculating a sum of the first result and the third result as the nominal channel spacing between the adjacent carriers.

10. An apparatus for implementing carrier aggregation transmission, comprising a bearing module, an aggregation module and a transmission module; wherein
the bearing module is configured to bear N carriers in a preset band, where N is a positive integer greater than 1, and a nominal bandwidth value of the N carriers is less than or equal to 5 MHz;
the aggregation module is configured to aggregate the N carriers, to make nominal channel spacing between adjacent carriers among the N carriers an integral multiple of 0.2 MHz; and
the transmission module is configured to transmit the N aggregated carriers from the aggregation module,
wherein a chip rate (Fc) of each carrier of the N carriers is equal to 3.84 Mega chips per second (Mcps) divided by Nc, wherein Nc is a positive integer;
a shaping filter factor (Fsp) of each carrier ranges from 1.2 to 1.3; and
a nominal bandwidth value B of each carrier is equal to Fc multiplied by Fsp, and is an integral multiple of 0.2 MHz.

11. The apparatus according to claim 10, wherein a nominal bandwidth value B of each carrier belongs to a first set B1 and the first set B1 is {0.6 MHz, 0.8 MHz, 1.2 MHz, 1.6 MHz, 2.4 MHz}.

12. The apparatus according to claim 10, wherein a nominal bandwidth value B of each carrier belongs to a second set B2 and the second set B2 is {0.8 MHz, 1.2 MHz, 1.6 MHz, 2.4 MHz}.

13. The apparatus according to claim 10, wherein a nominal bandwidth value B of each carrier belongs to a third set B3 and the third set B3 is {0.6 MHz, 0.8 MHz, 1.2 MHz, 1.6 MHz, 2.4 MHz, 5 MHz}.

14. The apparatus according to claim 10, wherein a nominal bandwidth value B of each carrier belongs to a fourth set B4 and the fourth set B4 is {0.8 MHz, 1.2 MHz, 1.6 MHz, 2.4 MHz, 5 MHz}.

15. An apparatus for implementing carrier aggregation transmission, comprising an outputting device and a processor; wherein
the processor is configured to:
bear N carriers in a preset band, wherein N is a positive integer greater than 1, and a nominal bandwidth value of the N carriers is less than or equal to 5 MHz; and
aggregate the N carriers, to make nominal channel spacing between adjacent carriers of the N carriers an integral multiple of 0.2 MHz, and
the outputting device is configured to transmit the N aggregated carriers,
wherein a chip rate (Fc) of each carrier borne in the preset band by the processor is equal to 3.84 Mega chips per second (Mcps) divided by Nc, where Nc is a positive integer;
a shaping filter factor (Fsp) of each carrier ranges from 1.2 to 1.3;
and a nominal bandwidth value B of each carrier is equal to Fc multiplied by Fsp, and is an integral multiple of 0.2 MHz.

16. The apparatus according to claim 15, wherein a nominal bandwidth value B of each carrier borne in the preset band by the processor belongs to a first set B1 and the first set B1 is {0.6 MHz, 0.8 MHz, 1.2 MHz, 1.6 MHz, 2.4 MHz}.

17. The apparatus according to claim 16, wherein the processor is further configured to: calculate a half of a sum of the nominal bandwidth values of the adjacent carriers as a first result; calculate a half of an absolute value of a difference between the nominal bandwidth values of the adjacent carriers as a second result; calculate a remainder of the second result with respect to 0.2 MHz as a third result; and calculate a sum of the first result and the third result as the nominal channel spacing between the adjacent carriers.

* * * * *